US011863237B2

(12) United States Patent
Lee (10) Patent No.: US 11,863,237 B2
(45) Date of Patent: Jan. 2, 2024

(54) OPTICAL COMMUNICATION DEVICE AND METHOD FOR SETTING WAVELENGTH THEREOF

(71) Applicant: SOLiD, INC., Seongnam-si (KR)

(72) Inventor: Eun Sung Lee, Ansan-si (KR)

(73) Assignee: SOLiD, INC., Seongnam-si (KR)

( * ) Notice: Subject to any disclaimer, the term of this patent is extended or adjusted under 35 U.S.C. 154(b) by 34 days.

(21) Appl. No.: 17/456,279

(22) Filed: Nov. 23, 2021

(65) Prior Publication Data

US 2022/0166519 A1 May 26, 2022

(30) Foreign Application Priority Data

Nov. 24, 2020 (KR) .................. 10-2020-0158988
Nov. 22, 2021 (KR) .................. 10-2021-0161334

(51) Int. Cl.
*H04B 10/572* (2013.01)
*H04J 14/02* (2006.01)

(52) U.S. Cl.
CPC ............ *H04B 10/572* (2013.01); *H04J 14/02* (2013.01)

(58) Field of Classification Search
CPC ...... H04B 10/572; H04B 10/40; H04B 10/43; H04J 14/02; H04J 14/00; H04J 14/0307; H04Q 11/0005; H04Q 11/0062; H04Q 2011/0016; H04Q 11/0001; H04Q 2011/0039; H04Q 11/00
USPC .......................... 398/48, 45, 79, 95, 68, 135
See application file for complete search history.

(56) References Cited

U.S. PATENT DOCUMENTS

| 8,401,386 | B2 | 3/2013 | Izumi | |
| 2004/0172444 | A1* | 9/2004 | Nakamura | ......... H04Q 11/0005 709/200 |
| 2005/0163503 | A1 | 7/2005 | Lee et al. | |
| 2010/0260499 | A1* | 10/2010 | Izumi | ................. H04Q 11/0062 398/48 |
| 2020/0052790 | A1* | 2/2020 | Nomura | ................. H04B 10/80 |

(Continued)

FOREIGN PATENT DOCUMENTS

EP    1 892 870 A1    2/2008

OTHER PUBLICATIONS

Extended European Search Report dated Apr. 14, 2022, issued in European Application No. 21210164.6.

*Primary Examiner* — Hibret A Woldekidan
(74) *Attorney, Agent, or Firm* — Sughrue Mion, PLLC (57) ABSTRACT

An optical communication device includes: a first multiplexer including a first transmitting port and a second transmitting port; a downstream wavelength analyzer configured to analyze first transmission light to recognize a first downstream wavelength corresponding to the first transmission light and analyze second transmission light to recognize a second downstream wavelength corresponding to the second transmission light; and a controller configured to generate a first control signal for allowing the first transmitting port to pass light corresponding to the first downstream wavelength and allowing the second transmitting port to pass light corresponding to the second downstream wavelength, and output the first control signal to the first multiplexer, wherein the first multiplexer, according to the first control signal, controls the first transmitting port to correspond to the first downstream wavelength and controls the second transmitting port to correspond to the second downstream wavelength.

18 Claims, 4 Drawing Sheets

(56) References Cited

U.S. PATENT DOCUMENTS

2020/0169348 A1    5/2020  Satou
2021/0021347 A1*   1/2021  Nakada ............... H04J 14/0258

* cited by examiner

OPTICAL COMMUNICATION DEVICE AND METHOD FOR SETTING WAVELENGTH THEREOF

CROSS-REFERENCE TO RELATED APPLICATION

This application claims the benefits of Korean Patent Application No. 10-2020-0158988, filed on Nov. 24, 2020, and Korean Patent Application No. 10-2021-0161334, filed on Nov. 22, 2021 in the Korean Intellectual Property Office, the disclosures of which are incorporated herein in its entirety by references.

BACKGROUND

1. Field

The present disclosure relates to an optical communication device and a method of setting a wavelength thereof, and more particularly, to an optical communication device capable of automatically setting a wavelength for communication channel connection between optical communication devices, and a method of setting a wavelength thereof.

2. Description of the Related Art

A passive optical network (hereinafter referred to as 'PON') has become the core of FTTH environment implementation and Giga-bit Ethernet implementation. The PON includes an optical line terminal (OLT) of a central office, a Remote Node (RN) to allow multiple subscribers to share one feeder optical cable, and an optical network terminal (ONT) or an optical network unit (ONU) on the subscriber side. An optical cable is connected to an optical transceiver of the OLT and an optical transceiver of the ONT or ONU, respectively, to connect the OLT to the ONT/ONU. The optical transceiver is for transmitting and receiving an optical signal through an optical cable connected to the optical transceiver, and may be an optical transmission/reception module such as a gigabit interface converter (GBIC), small form-factor pluggable (SFP), and the like.

A separation distance between the OLT and the ONT/ONU is usually several km to several tens km. Therefore, it is very cumbersome and time consuming for an administrator to visit the site and set wavelengths of optical signals that may communicate with each other between the OLT and the ONT/ONU.

SUMMARY

Provided are methods of automatically setting wavelengths of optical signals between optical communication devices without an administrator's visit, and optical communication devices in which the methods are implemented.

According to an aspect of an embodiment, an optical communication device comprises a first multiplexer including a first transmitting port and a second transmitting port; a downstream wavelength analyzer configured to analyze first transmission light to recognize a first downstream wavelength corresponding to the first transmission light and analyze second transmission light to recognize a second downstream wavelength corresponding to the second transmission light; and a controller configured to generate a first control signal for allowing the first transmitting port to pass light corresponding to the first downstream wavelength and allowing the second transmitting port to pass light corresponding to the second downstream wavelength, and output the first control signal to the first multiplexer, wherein the first multiplexer, according to the first control signal, controls the first transmitting port to correspond to the first downstream wavelength and controls the second transmitting port to correspond to the second downstream wavelength.

According to an exemplary embodiment, the downstream wavelength analyzer is configured to receive first partial transmission light input by coupling a portion of the first transmission light and second partial transmission light input by coupling a portion of the second transmission light, analyze the received first partial transmission light and the second partial transmission light, and recognize the first downstream wavelength and the second downstream wavelength.

According to an exemplary embodiment, the first transmission light includes first downstream wavelength information, and the second transmission light includes second downstream wavelength information, wherein the downstream wavelength analyzer is configured to analyze at least a portion of the first downstream wavelength information included in the input first partial transmission light and recognize the first downstream wavelength, and analyze at least a portion of the second downstream wavelength information included in the input second partial transmission light and recognize the second downstream wavelength.

According to an exemplary embodiment, the first downstream wavelength information and the second downstream wavelength information correspond to an auxiliary management and control channel (AMCC).

According to an exemplary embodiment, the first multiplexer includes wavelength selective switches (WSS), and controls the WSS to correspond to the first control signal.

According to an exemplary embodiment, the optical communication device further comprises an upstream wavelength analyzer configured to recognize a first upstream wavelength corresponding to first reply light and a second upstream wavelength corresponding to second reply light, wherein the controller is configured to generate a second control signal for allowing a first receiving port to pass light corresponding to the first upstream wavelength and allowing a second receiving port to pass light corresponding to the second upstream wavelength, and output the generated second control signal to the first multiplexer, and the first multiplexer includes the first receiving port and the second receiving port, and controls, according to the second control signal, the first receiving port to correspond to the first upstream wavelength and the second receiving port to correspond to the second upstream wavelength.

According to an exemplary embodiment, the upstream wavelength analyzer is configured to analyze first partial reply light input by coupling a portion of the first reply light and recognize the first upstream wavelength, and analyze second partial reply light input by coupling a portion of the second reply light and recognize the second upstream wavelength.

According to an exemplary embodiment, the first reply light includes first upstream wavelength information, the second reply light includes second upstream wavelength information, the first upstream wavelength information includes information about the first upstream wavelength and information about the first downstream wavelength, and the second upstream wavelength information includes information about the second upstream wavelength and information about the second downstream wavelength, wherein the upstream wavelength analyzer is configured to analyze the first upstream wavelength information through the first partial reply light and recognize the first upstream wavelength, and analyze the second upstream wavelength information through the second partial reply light and recognize the second upstream wavelength.

According to an exemplary embodiment, each of the first upstream wavelength information and the second upstream wavelength information corresponds to an auxiliary management and control channel (AMCC).

According to an exemplary embodiment, the optical communication device further comprises a second multiplexer configured to separate a portion of input reply light into the first partial reply light and the second partial reply light and output the first partial reply light and the second partial reply light to the upstream wavelength analyzer, wherein the reply light is an optical signal received from the outside in response to transmission of transmission light, and a portion of the reply light is input to the first multiplexer, and another portion of the reply light is input to the second multiplexer, and the transmission light is an optical signal transmitted to the outside from the first multiplexer by combining optical signals of the first transmitting port and the second transmitting port.

According to an aspect of another embodiment, a method of setting a wavelength of an optical communication device comprises recognizing a first downstream wavelength corresponding to first transmission light by analyzing the first transmission light, and recognizing a second downstream wavelength corresponding to second transmission light by analyzing the second transmission light; generating a first control signal for allowing a first transmitting port to pass light corresponding to the first downstream wavelength and allowing a second transmitting port to pass light corresponding to the second downstream wavelength; outputting the generated first control signal to a first multiplexer including the first transmitting port and the second transmitting port; and according to the first control signal, controlling the first transmitting port to correspond to the first downstream wavelength and the second transmitting port to correspond to the second downstream wavelength.

According to an aspect of another embodiment, an optical wavelength setting device comprises a downstream wavelength analyzer configured to analyze first transmission light and the second transmission light output from the first optical communication device and recognize a first downstream wavelength corresponding to the first transmission light and a second downstream wavelength corresponding to the second transmission light; and a controller configured to generate a first control signal for allowing a first transmitting port of a first multiplexer to pass light corresponding to the first downstream wavelength and allowing a second transmitting port of the first multiplexer to pass light corresponding to the second downstream wavelength, and to output the generated first control signal to the first multiplexer.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Since the disclosure may have diverse modified embodiments, preferred embodiments are illustrated in the drawings and are described in the detailed description. However, this is not intended to limit the disclosure to particular modes of practice, and it is to be appreciated that all changes, equivalents, and substitutes that do not depart from the spirit and technical scope of the disclosure are encompassed in the disclosure.

In the description of the disclosure, certain detailed explanations of the related art are omitted when it is deemed that they may unnecessarily obscure the essence of the disclosure. In addition, numeral figures (e.g., first, second, and the like) used during describing the specification are just identification symbols for distinguishing one element from another element.

Further, in the specification, if it is described that one component "is connected to" or "accesses" the other component, it is understood that the one component may be directly connected to or may directly access the other component but unless explicitly described to the contrary, another component may be "connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software.

In addition, it is intended to clarify that the division of the components in the specification is only made for each main function that each component is responsible for. That is, two or more components to be described later below may be combined into one component, or one components may be divided into two or more components according to more subdivided functions. In addition, it goes without saying that each of the components to be described later below may additionally perform some or all of the functions of other components in addition to its own main function, and some of the main functions that each of the components is responsible for may be dedicated and performed by other components.

An optical communication system according to embodiments may be applied to various optical communication networks based on a wavelength division multiplexing-passive optical network (WDM-PON), which are located in remote locations and are composed of optical communication devices that transmit and receive optical signals through corresponding optical communication modules (optical transceiver).

For example, the optical communication system may configure an optical transport network that is a sub-network constituting a fronthaul segment of a radio access network architecture. However, the disclosure is not limited thereto, and the technical spirit of the disclosure may be applied to a midhaul segment and a backhaul segment of the radio access network architecture. As another example, the optical communication system may be applied to an optical subscriber network. As another example, the optical communication system may be applied to a distributed antenna system (DAS) for resolving a shadow area of a base station.

Hereinafter, for convenience of description, in a case where the optical communication system configures a fronthaul segment of the radio access network architecture described above, an embodiment of a system including an optical communication device (e.g., a central office terminal (COT)) connected to a digital unit or baseband unit at a central office side and an optical communication device (e.g., a remote terminal (RT)) connected to a remote unit or remote radio head at a remote location will be mainly described.

Hereinafter, various embodiments will be described in detail in order.

Figure 1:
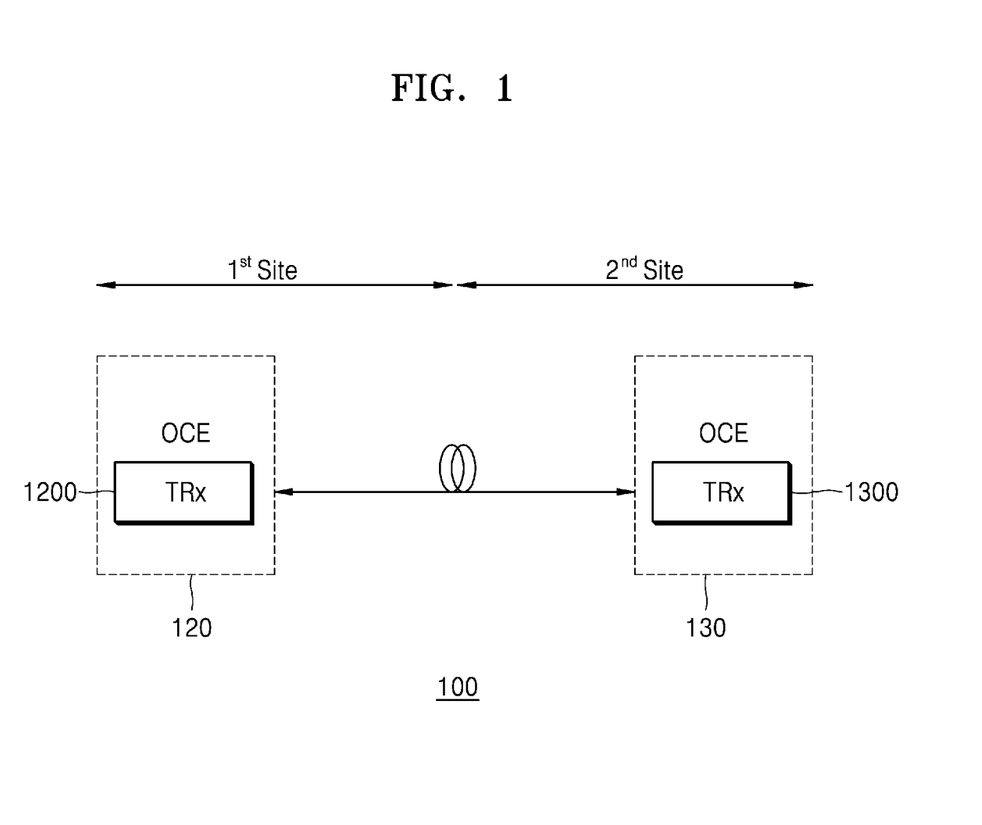
FIG. 1 is a configuration diagram of an optical communication system according to an embodiment.

FIG. 1 is a configuration diagram of an optical communication system according to an embodiment.

Referring to FIG. 1, an optical communication system 100 according to an embodiment may include a first optical communication device 120 and a second optical communication device 130. In FIG. 1, only one second optical communication device 130 is illustrated for convenience of description, but the inventive concept of the disclosure is not limited thereto.

The first optical communication device 120 may be located on the side of a first site, and may include at least one optical transceiver 1200. The second optical communication device 130 may be located at a second site apart from the first site by a certain distance, and may include at least one optical transceiver 1300. The first optical communication device 120 and the second optical communication device 130 may be communicatively connected to each other through the respective optical transceivers 1200 and 1300 and an optical cable connecting them.

In some embodiments, the optical communication system 100 may be applied to an optical subscriber network. In this case, the first optical communication device 120 may be an optical line terminal (OLT) at a central office side. In addition, the second optical communication device 130 may be any one of a remote terminal (RT), an optical network terminal (ONT) at a subscriber side, and an optical network unit.

In another embodiment, the optical communication system 100 may be applied to a fronthaul transmission network of a distributed base station. In this case, the first optical communication device 120 may be a digital unit (DU) at the central office side or a termination device at a baseband unit (BBU) side. In addition, the second optical communication device 130 may be a remote unit (RU) or a remote radio head (RRH).

In another embodiment, the optical communication system 100 may be applied to a distributed antenna system (DAS) for solving a shadow area of a base station. In this case, the first optical communication device 120 may be a headend unit, and the second optical communication device 130 may be an extension unit or a remote unit.

As described above, the optical communication system 100 according to the inventive concept may be applied to various optical communication networks implemented by optical communication devices that are located remotely from each other and transmit and receive optical signals through corresponding optical transceivers.

Hereinafter, an 'optical wavelength automatic setting operation' between the first optical communication device 120 and the second optical communication device 130 in the optical communication system 100 according to an embodiment will be described in detail with reference to FIGS. 2 to 4.

Figure 2:
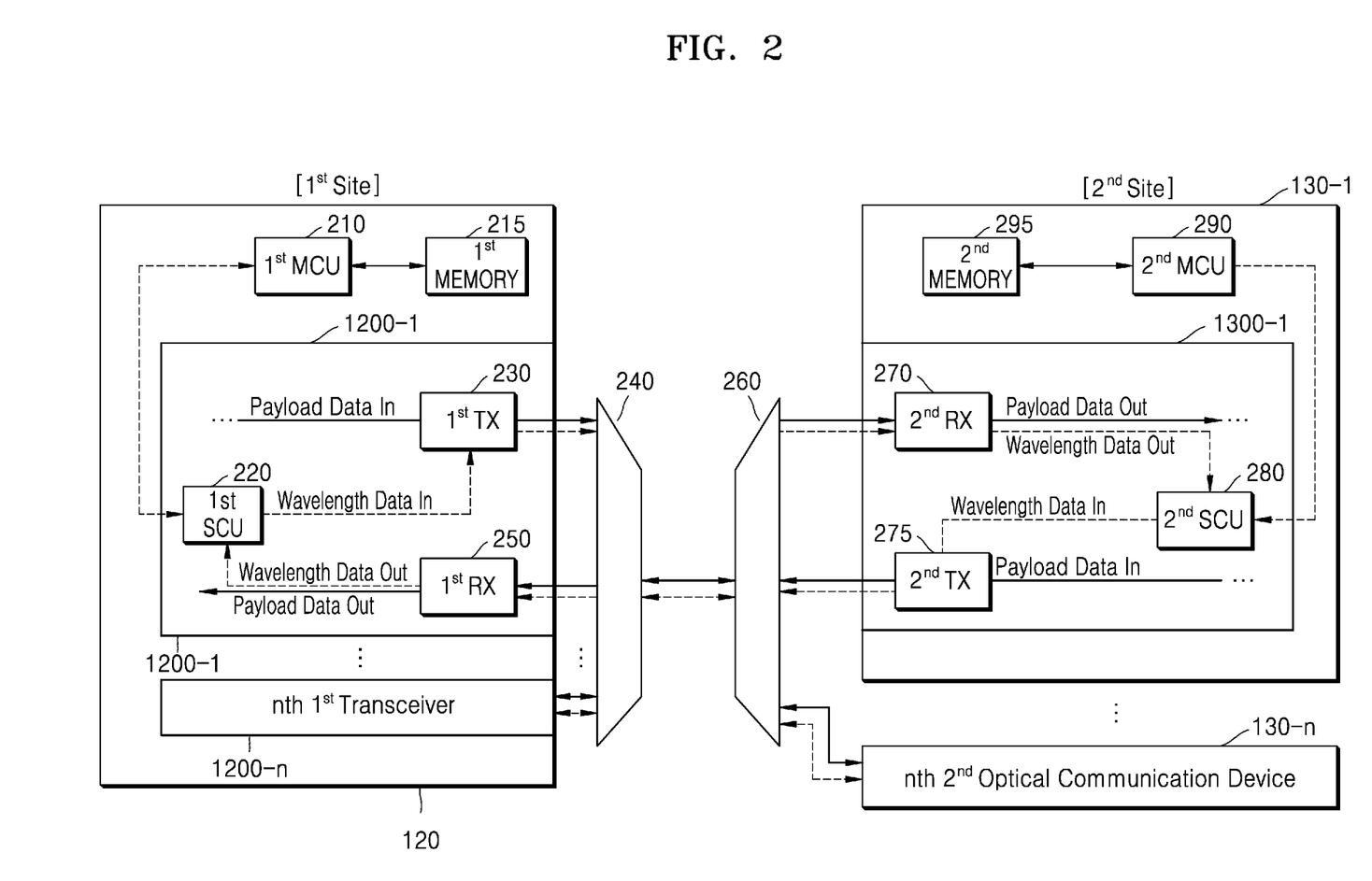
FIG. 2 is a block diagram of an optical communication device according to an embodiment.

FIG. 2 is a block diagram of an optical communication device according to an embodiment. It should be noted that FIG. 2 shows a main portion of an optical transceiver included in the optical communication device in more detail on the assumption that the optical communication system 100 of FIG. 1 is applied to a WDM-PON. In addition, solid arrows shown in FIG. 2 may indicate moving paths of payload data, and dotted arrows may indicate moving paths of auxiliary management data (e.g., auxiliary management and control channel (AMCC) data).

Referring to FIG. 2, among a plurality of optical communication devices constituting the optical communication system 100 according to an embodiment, the first optical communication device 120 may include a first main controller (MCU) 210, a first memory 215, and n first optical transceivers 1200-1 to 1200-n (where n is a natural number of 2 or more).

Each of the n first optical transceivers 1200-1 to 1200-n may include a first sub controller (SCU) 220, a first transmitter 230, and a first receiver 250. The n first optical transceivers 1200 to 1200-n may be connected to a first multiplexer (MUX) 240 to transmit an optical signal to the first MUX 240 or may receive an optical signal of a corresponding wavelength band from the first MUX 240.

In addition, among a plurality of optical communication devices constituting the optical communication system 100 according to an embodiment, each of n second optical communication devices 130-1 to 130-n may include the second optical transceiver 1300, a second main controller (MCU) 290, and a second memory 295.

Each of the n second optical transceivers 1300 may include a second sub controller 280, a second receiver 270, and a second transmitter 275. The n second optical transceivers 1300 may be connected to a second MUX 260 to transmit an optical signal to the second MUX 160 or may receive an optical signal from the second MUX 160.

According to an embodiment, the first MUX 240 on the first optical communication device 120 side may be a separate device separated from the first optical communication device 120 or may be a component provided inside the first optical communication device 120. In addition, the second MUX 260 may be a separate device from the n second optical communication devices 130-1 to 130-n, but may be configured in plural and may be provided inside then second optical communication devices 130-1 to 130-n, respectively. In this case, the n second optical communication devices 130-1 to 130-n may include a plurality of optical transceivers, respectively.

According to an embodiment, the first optical communication device 120, the first MUX 240, and the second MUX 260 may be connected to each other in a ring topology. In addition, according to an embodiment, a plurality of sub-multiplexers may be connected to the second MUX 260, and a tree topology may be formed in such a way that the second optical communication devices 130-1 to 130-n are connected to the sub-multiplexers.

First, the first MCU 210 may be configured to control the operation of the first optical communication device 120. The first MCU 210 may be connected to an external device such as a server or a network monitoring system (NMS) to transmit/receive information and data necessary for the operation of the first optical communication device 120.

The first memory 215 is a space in which program instructions and various types of information necessary for the operation of the first optical communication device 12 are stored, and may include a data storage medium such as a magnetic disk or a solid-state drive (SSD).

The first sub controller 220 is configured to be wired or wirelessly connected to the first MCU 210, and may manage and control the first optical transceiver 1200-1. The first sub controller 220 may process payload data transmission/reception and control management (wavelength setting/control, communication state monitoring, etc.) between the first optical transceiver 1200-1 and the second optical transceiver 1300-1. The first sub controller 220 is an active configuration of the first optical transceiver 1200-1, and may be a term that collectively refers to a processor for performing various control and processing, a memory in which firmware, etc. are stored for transmission of first auxiliary management data of low speed through an auxiliary management and control channel together with high-speed payload data.

The first sub controller 220 may transmit the first auxiliary management data to the second optical transceiver 1300-1 according to various methods.

For example, the first sub controller 220 may simultaneously transmit the first auxiliary management data and the payload data to the second optical transceiver 1300-1 through a baseband intensity over-modulation method. For another example, the first sub controller 220 may overlap the first auxiliary management data and the payload data and may transmit the same to the second optical transceiver 1300-1 through a radio frequency (RF) pilot tone method.

The baseband intensity over-modulation method is a technology in which the first auxiliary management data is stacked on top of the payload data, and the RF pilot tone method is a technology of overlapping ASK or FSK modulated first auxiliary management data with the payload data. A transmission rate of the first auxiliary management data may be different from a transmission rate of the payload data. For example, a frequency of the first auxiliary management data may be several kHz, and a frequency of the payload data may be tens to hundreds of MHz. A first auxiliary management data transmission/reception method, such as the baseband intensity over-modulation and the RF pilot tone method, has already been disclosed, and thus, detailed contents thereof are omitted.

In particular, the first sub controller 220 may generate first downstream wavelength information when a first test optical signal is transmitted. The first test optical signal is that preset 'test information' is generated as an optical signal of a first downstream wavelength, and the first downstream wavelength information is auxiliary management data generated by the first sub controller 220 and may include information about a length of the first downstream wavelength. In other words, the first sub controller 220 may generate information about a wavelength of the first test optical signal as the first auxiliary management data (hereinafter, first auxiliary management data corresponding to the wavelength of the first test optical signal is referred to as 'first downstream wavelength information'). The first downstream wavelength information may be information generated to correspond to an AMCC by the first sub controller 220. In addition, the first sub controller 220 may output the generated first downstream wavelength information to the first transmitter 230.

The first transmitter 230 is configured to convert received payload data and/or first auxiliary management data into an optical signal. The first transmitter 230 may include a transmitter optical sub-assemblies (TOSA) made of a laser diode, laser diode driving circuitry (LDD), biasing circuitry, and the like. Payload data input to the first transmitter 230 may be input through the LDD. In particular, the first transmitter 230 may generate first transmission light. The first transmission light may include a first test optical signal and a first downstream wavelength optical signal. The first test optical signal may be obtained by the first transmitter 230 converting test information into an optical signal. The first downstream wavelength optical signal may be obtained by the first transmitter 230 converting the first downstream wavelength information into an optical signal. The first test optical signal and the first downstream wavelength optical signal may be combined into the first transmission light, but may be transmitted to the outside through different channels and wavelengths. This is because the first downstream wavelength optical signal is an optical signal corresponding to an AMCC.

The first transmitter 230 may output the first transmission light to the first MUX 240.

The first MUX 240 may be configured to multiplex an optical signal input from the first transmitter 230 and transmit the optical signal to an optical cable, and demultiplex signals received from the optical cable. In addition, the first MUX 240 may include wavelength selective switches (WSS). Accordingly, when a control signal is received, the first MUX 240 may control a wavelength of each switch of the WSS to correspond to the control signal (this will be described later with reference to FIG. 3).

The first receiver 250 may divide an optical signal input after being demultiplexed in the first MUX 240 into payload data and second auxiliary management data (the definition of the second auxiliary management data will be described later below) and output the payload data and the second auxiliary management data in corresponding configurations, respectively. In particular, the first receiver 250 may output the second auxiliary management data to the first controller 220. The first receiver 250 may include a photo diode, a receiver optical sub-assembly (ROSA) including a trans-impedance amplifier (TIA), a post amplifier, and the like.

In the above, the configuration of the first optical transceiver 1200-1 from among the n first optical transceivers 1200-1 to 1200-n has been described. Configurations of the remaining first optical transceivers 1200-2 to 1200-n are substantially the same as that of the first optical transceiver 1200-1, so a description thereof will be omitted.

The second sub controller 280 of the second optical transceiver 1300-1 may be configured to generally control the operation of the second optical transceiver 1300-1.

The second sub controller 280 may manage transmission/reception of payload data between the first optical transceiver 1200-1 and the second optical transceiver 1300-1 and transmission/reception of information (hereinafter referred to as second auxiliary management data) for management and control (wavelength setting, communication state monitoring, etc.), and the like. The second sub controller 280 may transmit the payload data and second auxiliary management data to the first optical transceiver 1200-1 according to various methods. Like the first sub controller 220, the second sub controller 280 may transmit the second auxiliary management data to the first optical transceiver 1200-1 without affecting the payload data through various methods. The second sub controller 280 is an active configuration of the second optical transceiver 1300-1, and may collectively refer to a processor that processes and controls information that can be transmitted and received through an auxiliary management and control channel, a memory in which firmware, etc. are stored, and the like.

The second receiver 270 may be configured to correspond to the first receiver 250, and the second transmitter 275 may be configured to correspond to the first transmitter 230.

The payload data and the second auxiliary management data transmitted to the first optical transceiver 1200-1 through the second transmitter 275 and the second MUX 260 may be converted into an optical signal and multiplexed. An optical signal received from the first optical transceiver 1200-1 through the second MUX 260 and the second receiver 270 may be demultiplexed and converted into an electrical signal.

The second MCU 290 and the second memory 295 have configurations similar to those of the first MCU 210 and the first memory 215, respectively, and thus a redundant description thereof will be omitted.

In the above, all functions of respective components of the first and second optical transceivers 1200-1 and 1300-1 have been described. Hereinafter, an automatic wavelength setting operation for establishing a communication channel between the n first optical transceivers 1200-1 to 1200-$n$ and then second optical transceivers 1300 will be described in detail with reference to FIGS. 3 and 4.

Figure 3:
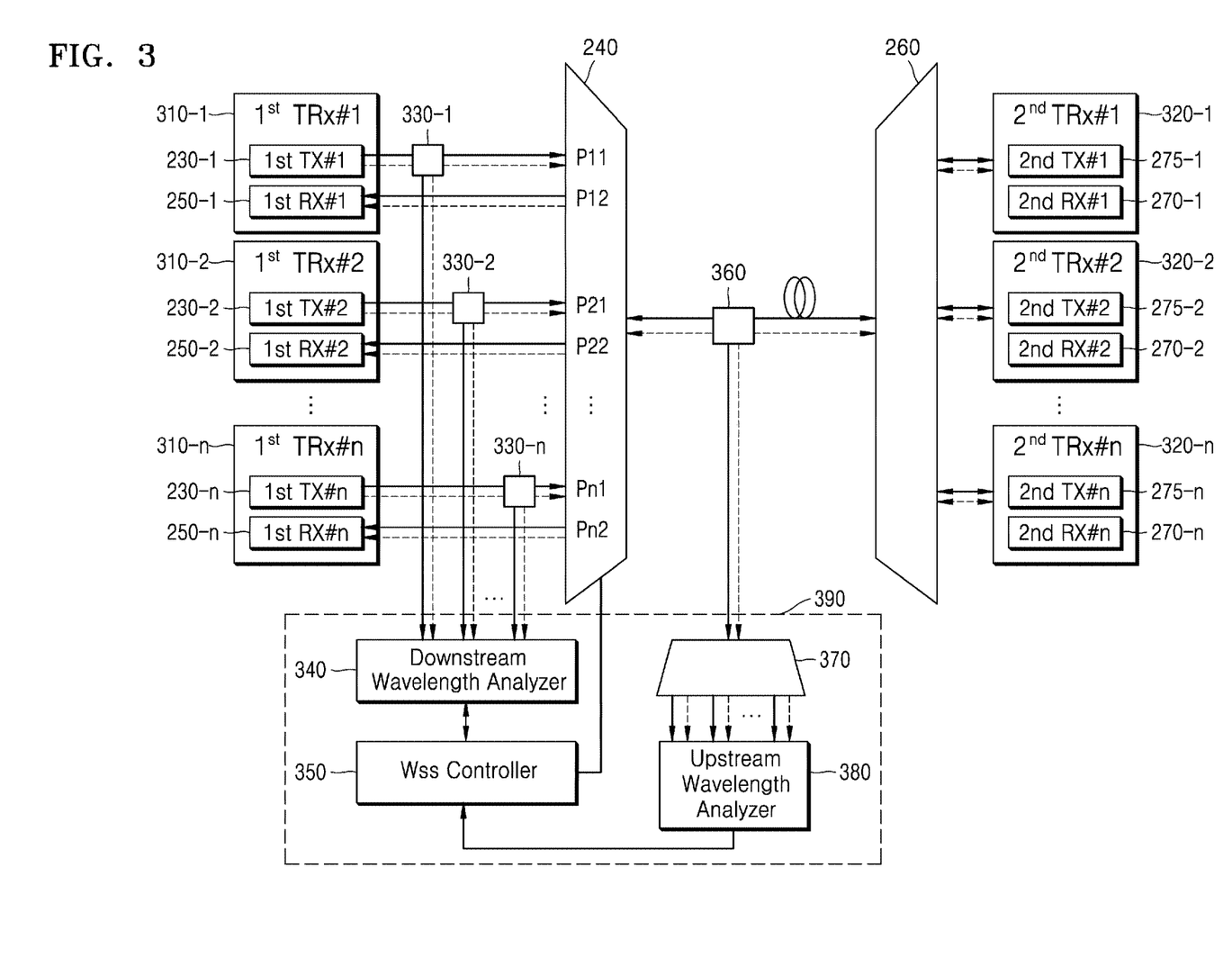
FIG. 3 is a configuration diagram of an optical module and an optical wavelength setting device according to an embodiment.

FIG. 3 is a configuration diagram of an optical module and an optical wavelength setting device according to an embodiment. Solid arrows shown in FIG. 3 may indicate moving paths of payload data, and dotted arrows may indicate moving paths of auxiliary management data (e.g., AMCC data).

Referring to FIG. 3, each of n first optical transceivers, that is, each of a first-1 optical transceiver 310-1 to a first-n optical transceiver 310-$n$ may be connected to the first MUX 240.

A first-1 transmitter 230-1 of the first-1 optical transceiver 310-1 may be connected to a first transmitting port P11 of the first MUX 240, and a first-1 receiver 250-1 may be connected to a first receiving port P12 of the first MUX 240. A first-2 transmitter 230-2 of the first-2 optical transceiver 310-2 may be connected to a second transmitting port P21 of the first MUX 240, and a first-2 receiver 250-2 may be connected to a second receiving port P22 of the first MUX 240. Similarly, a first-n transmitter 230-$n$ of the first-n optical transceiver 310-$n$ may be connected to an $n^{th}$ transmitting port Pn1 of the first MUX 240, and a first-n receiver 250-$n$ may be connected to an $n^{th}$ receiving port Pn2 of the first MUX 240.

The first-1 transmitter 230-1 and the first transmitting port P11 of the first MUX 240 may be connected to each other by wire (e.g., an optical cable), and a first transmission coupler 330-1 may be formed in the optical cable. The first transmission coupler 330-1 may couple first transmission light output from the first-1 transmitter 230-1 and output the first transmission light to a downstream wavelength analyzer 340. That is, first partial transmission light is an optical signal separated from the first transmission light by the first transmission coupler 330-1, and may be input to the downstream wavelength analyzer 340.

The first-2 transmitter 230-2 and the second transmitting port P21 of the first MUX 240 may be connected to each other by wire (e.g., an optical cable), and a second transmission coupler 330-2 may be formed in the optical cable. The second transmission coupler 330-2 may couple second transmission light output from the second transmitter 230-2 and output the second transmission light to the downstream wavelength analyzer 340. That is, second partial transmission light is an optical signal separated from the second transmission light by the second transmission coupler 330-2, and may be input to the downstream wavelength analyzer 340.

Similarly, the first-n transmitter 230-$n$ and the $n^{th}$ transmitting port Pn1 of the first MUX 240 may be connected to each other by wire (e.g., an optical cable), and an $n^{th}$ transmission coupler 330-$n$ may be formed in the optical cable. The $n^{th}$ transmission coupler 330-$n$ may couple $n^{th}$ transmission light output from the $n^{th}$ transmitter 230-$n$ and output the $n^{th}$ transmission light to the downstream wavelength analyzer 340. That is, $n^{th}$ partial transmission light is an optical signal separated from the $n^{th}$ transmission light by the $n^{th}$ transmission coupler 330-$n$, and may be input to the downstream wavelength analyzer 340.

The downstream wavelength analyzer 340 may receive first partial transmission light to $n^{th}$ partial transmission light. Because the first partial transmission light is a portion of the first transmission light, the first partial transmission light may include a portion of a first test optical signal and a portion of a first downstream wavelength optical signal. Therefore, the downstream wavelength analyzer 340 may separate the first partial transmission light into a portion of the first test optical signal and a portion of the first downstream wavelength optical signal, and then analyze the first downstream wavelength optical signal to recognize a first downstream wavelength. In addition, the downstream wavelength analyzer 340 may separate the second partial transmission light into a portion of a second test optical signal and a portion of a second downstream wavelength optical signal, and then analyze the second downstream wavelength optical signal to recognize the second downstream wavelength. In the same way, the downstream wavelength analyzer 340 may separate the $n^{th}$ partial transmission light into a portion of an $n^{th}$ test optical signal and a portion of an $n^{th}$ transmission wavelength optical signal, and then analyze the $n^{th}$ downstream wavelength optical signal to recognize an $n^{th}$ downstream wavelength.

As described above, the first to $n^{th}$ downstream wavelength optical signals may correspond to an AMCC. Accordingly, the downstream wavelength analyzer 340 may be configured to analyze an AMCC signal. In addition, the downstream wavelength analyzer 340 may output information about the first to $n^{th}$ downstream wavelengths to a WSS controller 350.

The WSS controller 350 may generate a first control signal by using information about the first to $n^{th}$ downstream wavelengths. For example, the WSS controller 350 may generate a first control signal that allows the first transmitting port P11 to pass a signal of the first downstream wavelength, allows the second transmitting port P21 to pass a signal of the second downstream wavelength, and allows the $n^{th}$ transmitting port Pn1 to pass a signal of the $n^{th}$ downstream wavelength. In other words, the first control signal may be a signal for controlling individual filters of the transmitting ports P11 to Pn1 respectively corresponding to the first to $n^{th}$ transmission lights.

The WSS controller 350 may output the first control signal to the first MUX 240.

The first MUX 240 may include WSS, and may control the WSS according to the first control signal. For example, a switch capable of selecting a wavelength may be formed in each transmitting port and receiving port of the first MUX 240, and the first MUX 240 may control individual switches formed in each transmitting port and receiving port according to the first control signal. That is, the first MUX 240 may control a first-1 switch corresponding to the first transmitting port P11 to correspond to the first downstream wavelength. In addition, the first MUX 240 may control the second-1 switch corresponding to the second transmitting port P21 to correspond to the second downstream wavelength. Similarly, the first MUX 240 may control an $n^{th}$–1 switch corresponding to the $n^{th}$ transmitting port Pn1 to correspond to the $n^{th}$ downstream wavelength.

Accordingly, the first transmitting port P11 may output only an optical signal corresponding to the first downstream wavelength, the second transmitting port P21 may output only an optical signal corresponding to the second downstream wavelength, and the $n^{th}$ transmitting port Pn1 may output only an optical signal corresponding to the $n^{th}$ downstream wavelength.

In addition, the first MUX 240 may multiplex optical signals output from the first transmitting port P11 to the $n^{th}$ transmitting port Pn1 to generate 'multiplexed transmission light', and may transmit the multiplexed transmission light to the second MUX 260 through an optical cable.

When the multiplexed transmission light is received, the second MUX 260 may demultiplex the multiplexed transmission light and output the same to each of n second optical transceivers 320-1 to 320-$n$. For example, the second MUX 260 may output a portion of the first transmission light included in the multiplexed transmission light (a portion of the first transmission light excluding the first partial transmission light, hereinafter, the portion received by the second MUX 260 will be abbreviated as 'first transmission light') to the second-1 optical transceiver 320-1 corresponding to the first transmission light. In addition, the second MUX 260 may output the second transmission light included in the multiplexed transmission light to the second-2 optical transceiver 320-2 corresponding to the second transmission light. Similarly, the second MUX 260 may output the $n^{th}$ transmission light included in the multiplexed transmission light to the second-n optical transceiver 320-$n$ corresponding to the $n^{th}$ transmission light.

A second-1 receiver 270-1 of the second-1 optical transceiver 320-1 may receive the first transmission light. In the second-1 receiver 270-1, the first test optical signal and the first downstream wavelength optical signal of the first transmission light may be separated, and the first downstream wavelength optical signal may be output to the second-1 sub controller 280 (Wavelength Data Out).

The second-1 sub controller 280 may recognize the first downstream wavelength by analyzing the first downstream wavelength optical signal. In addition, the second-1 sub controller 280 may generate first upstream wavelength information when first reply light is transmitted in response to reception of the first transmission light. The first reply light is an optical signal set to be transmitted when the first transmission light is received, and may include preset test information (this may be independent of information corresponding to the first test optical signal) as payload data. For example, when the first transmission light is received, the second-1 optical transceiver 320-1 may generate a first reply light and output the first reply light to the second MUX 260. At this time, a second-1 transmitter 275-1 may generate preset test information as a first reply test optical signal, and the second-1 sub controller 280 may generate information about a wavelength of the first reply test optical signal as first auxiliary management data (hereinafter, the wavelength of the first reply test optical signal is referred to as a 'first upstream wavelength', and the first auxiliary management data corresponding to the first upstream wavelength is referred to as 'first upstream wavelength information'). The first upstream wavelength information may be information generated to correspond to an AMCC by the second-1 sub controller 280.

In addition, the second-1 sub controller 280 may include information about the first downstream wavelength in the first upstream wavelength information. Accordingly, the first upstream wavelength information may include information about a wavelength of the first test optical signal and a wavelength of the first reply test optical signal. In addition, the second-1 sub controller 280 may output the generated first upstream wavelength information to the second-1 transmitter 275-1.

The second-1 transmitter 275-1 may generate first reply light by using input test information and the first upstream wavelength information. Because this may be similar to the operation of the first-1 transmitter 230-1 for generating the first transmission light, a detailed description thereof will be omitted. In addition, the second-1 transmitter 275-1 may output the first reply light to the second MUX 260.

In the same way, a second-2 transmitter 275-2 may generate second reply light and output the same to the second MUX 260, and a second-n transmitter 275-$n$ may generate $n^{th}$ reply light and output the same to the second MUX 260. The first to $n^{th}$ reply lights include first to $n^{th}$ test optical signals and first to $n^{th}$ upstream wavelength optical signals, respectively, and the first to $n^{th}$ upstream wavelength optical signals may correspond to an AMCC as auxiliary management information.

The second MUX 260 may generate a multiplexed reply light by multiplexing the first to $n^{th}$ reply lights, and may transmit the multiplexed reply light to the first MUX 240 through an optical cable.

In this case, a reply coupler 360 may be formed between the first MUX 240 and the second MUX 260. The reply coupler 360 may couple a portion of the multiplexed reply light and output the same to a third MUX 370. In other words, 'partially multiplexed reply light' is an optical signal separated from the multiplexed reply light by the reply coupler 360 and may be input to the third MUX 370.

The third MUX 370 may demultiplex the partially multiplexed reply light and output the same to an upstream wavelength analyzer 380. For example, the third MUX 370 may demultiplex the partially multiplexed reply light and separate the same into first to $n^{th}$ partial reply lights, and output the first to $n^{th}$ partial reply lights to the upstream wavelength analyzer 380.

The upstream wavelength analyzer 380 may receive the first to $n^{th}$ partial reply lights. Because the first partial reply light is a portion of the first reply light, the first partial reply light may include a portion of the first upstream wavelength optical signal. Accordingly, the upstream wavelength analyzer 380 may separate a portion of the first upstream wavelength optical signal from the first partial reply light, and then analyze the first upstream wavelength optical signal to recognize the first upstream wavelength. In addition, the upstream wavelength analyzer 380 may separate a portion of the second upstream wavelength optical signal from the second partial reply light, and then analyze the second upstream wavelength optical signal to recognize the second upstream wavelength. In the same way, the upstream wavelength analyzer 380 may separate a portion of the $n^{th}$ upstream wavelength optical signal from the $n^{th}$ partial reply light, and then analyze the $n^{th}$ upstream wavelength optical signal to recognize the $n^{th}$ upstream wavelength.

As described above, the first to $n^{th}$ upstream wavelength optical signals may correspond to an AMCC. Accordingly, the upstream wavelength analyzer 380 may be configured to analyze an AMCC signal. In addition, the upstream wavelength analyzer 380 may output information about the first to $n^{th}$ upstream wavelengths to the WSS controller 350.

The WSS controller 350 may generate a second control signal by using information about the first to $n^{th}$ upstream wavelengths. For example, the WSS controller 350 may generate a second control signal that allows the first receiving port P12 to pass a signal of the first upstream wavelength, allows the second receiving port P22 to pass a signal of the second upstream wavelength, and allows the $n^{th}$ receiving port Pn2 to pass a signal of the $n^{th}$ upstream wavelength. In other words, the second control signal may be a signal for controlling individual filters of the receiving ports P12 to Pn2 respectively corresponding to the first to $n^{th}$ reply lights.

The WSS controller 350 may output the second control signal to the first MUX 240.

The first MUX 240 may include WSS, and may control the WSS according to the second control signal. For example, the first MUX 240 may control individual switches formed in each receiving port according to the second control signal. That is, the first MUX 240 may control the first-2 switch corresponding to the first receiving port P12 to correspond to the first upstream wavelength. In addition, the first MUX 240 may control the second-2 switch corresponding to the second receiving port P22 to correspond to the second upstream wavelength. Similarly, the first MUX 240 may control the $n^{th}$-2 switch corresponding to the $n^{th}$ receiving port Pn2 to correspond to the $n^{th}$ upstream wavelength.

Accordingly, the first receiving port P12 may output only an optical signal corresponding to the first upstream wavelength, the second receiving port P22 may output only an optical signal corresponding to the second upstream wavelength, and the $n^{th}$ receiving port Pn2 may output only an optical signal corresponding to the $n^{th}$ upstream wavelength.

In addition, the first MUX 240 may demultiplex a portion of the multiplexed reply light input through the optical cable (i.e., a portion of the multiplex reply light excluding the partially multiplexed reply light) and output the same to each of the n first optical transceivers 310-1 to 310-$n$.

Figure 4:
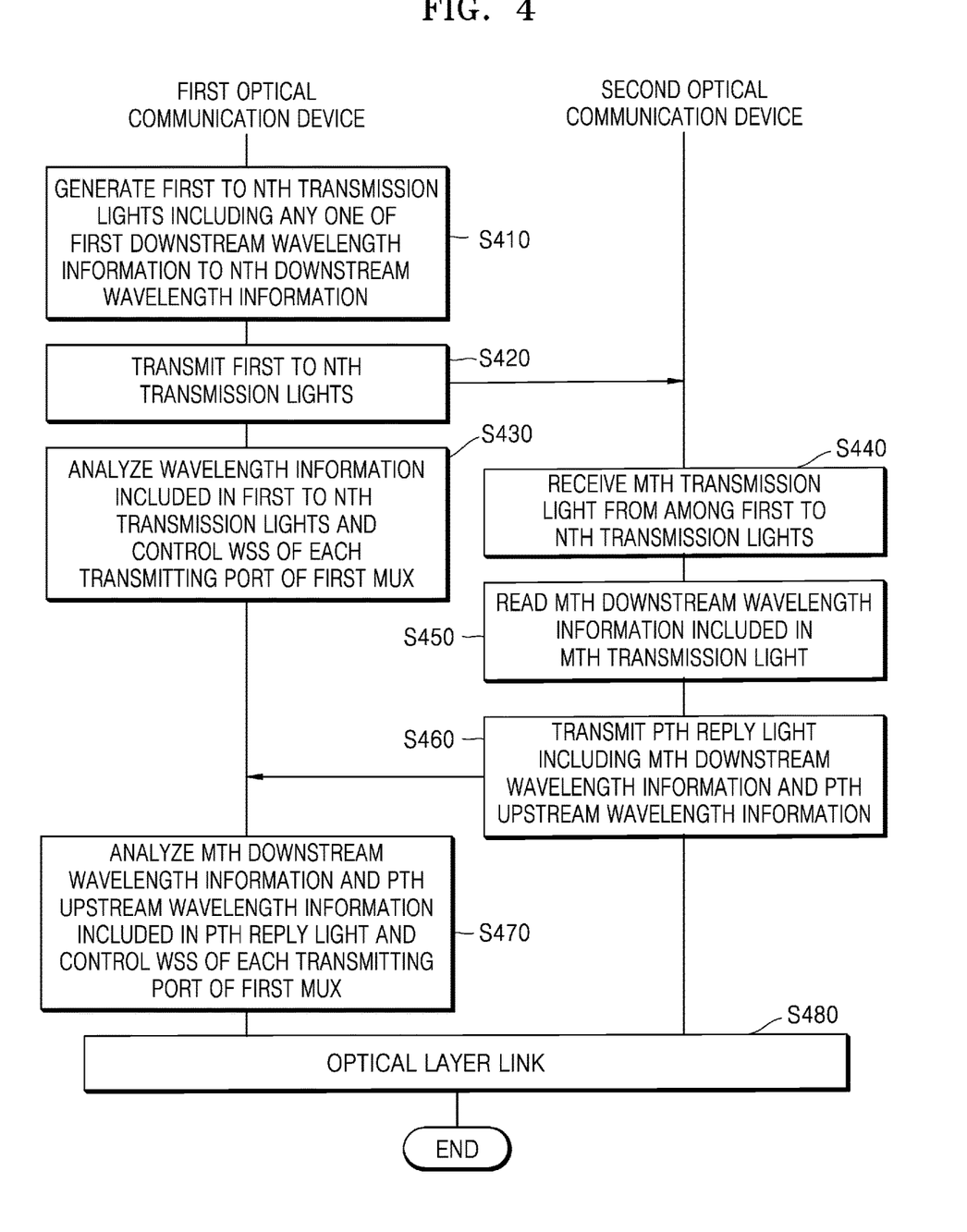
FIG. 4 is a flowchart illustrating an automatic optical wavelength setting operation according to an embodiment.

FIG. 4 is a flowchart illustrating an automatic optical wavelength setting operation according to an embodiment.

In FIG. 4, operations of each component (the downstream wavelength analyzer, WSS controller, upstream wavelength analyzer, and third MUX) of an optical wavelength setting device 390 described with reference to FIG. 3 are reconstructed over time and illustrated. Referring to FIG. 4, the automatic optical wavelength setting operation of the optical wavelength setting device 390 may be more easily understood.

Referring to FIG. 4, in operation S410, the first optical communication device 120 may generate first to $n^{th}$ transmission lights including any one of first downstream wavelength information to $n^{th}$ downstream wavelength information, and in operation S420, the first optical communication device 120 may transmit the generated first to $n^{th}$ transmission lights to the second optical communication device 130.

As described above, each of the n first optical transceivers 1200-1 to 1200-$n$ included in the first optical communication device may generate transmission light including downstream wavelength information. The first MUX 240 connected to the first optical transceivers 1200-1 to 1200-$n$ receives and multiplexes the first to $n^{th}$ transmission lights, and may transmit the multiplexed first to $n^{th}$ transmission lights to the second MUX 260 through an optical cable.

In operation S450, the second optical communication device 130 may receive the corresponding $m^{th}$ transmission light from among the first to $n^{th}$ transmission lights received from the first optical communication device, and may read $m^{th}$ downstream wavelength information included in the received $m^{th}$ transmission light (m is a natural number less than or equal to n).

The second MUX 260 may receive and demultiplex the multiplexed transmission lights. The second optical communication device 130 may receive the corresponding $m^{th}$ transmission light from among the demultiplexed first to $n^{th}$ transmission lights, and read $m^{th}$ downstream wavelength information included in the received $m^{th}$ transmission light.

In operation S460, the second optical communication device 130 may generate $p^{th}$ reply light including the read $m^{th}$ downstream wavelength information and $p^{th}$ upstream wavelength information, and may transmit the generated $p^{th}$ reply light to the first optical communication device 120 through the second MUX 260. The second MUX 260 may multiplex reply light provided from each of a plurality of second optical communication devices and transmit the multiplexed reply light to the first MUX 240. The first MUX 240 may demultiplex the received reply light.

In operation S470, the first optical communication device 120 may analyze downstream wavelength information and upstream wavelength information included in each of reply lights received from the second optical communication device, and control WSS according to a control signal generated based on a result of the analysis, and thus in operation S480, the first optical communication device 120 may set an optical wavelength between optical communication devices.

As described above, in the optical communication system 100 according to an embodiment, even if a plurality of wavelength-variable optical modules are included, an optical signal having a wavelength corresponding to these optical modules may be automatically set without an administrator's visit.

While the embodiments have been particularly shown and described, it will be understood by one of ordinary skill in the art that various changes in form and details may be made therein without departing from the spirit and scope of the disclosure as defined by the appended claims.

What is claimed is:

1. An optical communication device comprising:
a first multiplexer including a first transmitting port and a second transmitting port;
a downstream wavelength analyzer configured to analyze first transmission light to recognize a first downstream wavelength corresponding to the first transmission light and analyze second transmission light to recognize a second downstream wavelength corresponding to the second transmission light; and
a controller configured to generate a first control signal for allowing the first transmitting port to pass light corresponding to the first downstream wavelength and allowing the second transmitting port to pass light corresponding to the second downstream wavelength, and output the first control signal to the first multiplexer,
wherein the first multiplexer, according to the first control signal, controls the first transmitting port to correspond to the first downstream wavelength and controls the second transmitting port to correspond to the second downstream wavelength,
wherein the first transmitting port receives a transmission light of the first downstream wavelength from a first optical transceiver in the optical communication device, and the second transmitting port receives the second transmission light of the second downstream wavelength from a second optical transceiver in the optical communication device, and
wherein the downstream wavelength analyzer is configured to:

receive first partial transmission light input by coupling a portion of the first transmission light and second partial transmission light input by coupling a portion of the second transmission light, and analyze the received first partial transmission light and the second partial transmission light and recognize the first downstream wavelength and the second downstream wavelength.

2. The optical communication device of claim 1, wherein the first transmission light includes first downstream wavelength information, and the second transmission light includes second downstream wavelength information, wherein the downstream wavelength analyzer is configured to:

analyze at least a portion of the first downstream wavelength information included in the input first partial transmission light and recognize the first downstream wavelength, and analyze at least a portion of the second downstream wavelength information included in the input second partial transmission light and recognize the second downstream wavelength.

3. The optical communication device of claim 2, wherein the first downstream wavelength information and the second downstream wavelength information correspond to an auxiliary management and control channel (AMCC).

4. The optical communication device of claim 1, wherein the first multiplexer includes wavelength selective switches (WSS), and controls the WSS to correspond to the first control signal.

5. The optical communication device of claim 1, further comprising:

an upstream wavelength analyzer configured to recognize a first upstream wavelength corresponding to first reply light and a second upstream wavelength corresponding to second reply light, wherein the controller is configured to generate a second control signal for allowing a first receiving port to pass light corresponding to the first upstream wavelength and allowing a second receiving port to pass light corresponding to the second upstream wavelength, and output the generated second control signal to the first multiplexer, and the first multiplexer includes the first receiving port and the second receiving port, and controls, according to the second control signal, the first receiving port to correspond to the first upstream wavelength and the second receiving port to correspond to the second upstream wavelength, wherein the first receiving port transmits a reply light of the first upstream wavelength to the first optical transceiver, and the second receiving port transmits a reply light of the second upstream wavelength to the second optical transceiver.

6. The optical communication device of claim 5, wherein the upstream wavelength analyzer is configured to:

analyze first partial reply light input by coupling a portion of the first reply light and recognize the first upstream wavelength, and analyze second partial reply light input by coupling a portion of the second reply light and recognize the second upstream wavelength.

7. The optical communication device of claim 6, wherein the first reply light includes first upstream wavelength information, the second reply light includes second upstream wavelength information, the first upstream wavelength information includes information about the first upstream wavelength and information about the first downstream wavelength, and the second upstream wavelength information includes information about the second upstream wavelength and information about the second downstream wavelength, wherein the upstream wavelength analyzer is configured to:

analyze the first upstream wavelength information through the first partial reply light and recognize the first upstream wavelength, and analyze the second upstream wavelength information through the second partial reply light and recognize the second upstream wavelength.

8. The optical communication device of claim 7, wherein each of the first upstream wavelength information and the second upstream wavelength information corresponds to an auxiliary management and control channel (AMCC).

9. The optical communication device of claim 6, further comprising:

a second multiplexer configured to separate a portion of input reply light into the first partial reply light and the second partial reply light and output the first partial reply light and the second partial reply light to the upstream wavelength analyzer, wherein the reply light is an optical signal received from the outside in response to transmission of transmission light, and a portion of the reply light is input to the first multiplexer, and another portion of the reply light is input to the second multiplexer, and the transmission light is an optical signal transmitted to the outside from the first multiplexer by combining optical signals of the first transmitting port and the second transmitting port.

10. A method of setting a wavelength of an optical communication device, the method comprising:

recognizing a first downstream wavelength corresponding to first transmission light by analyzing the first transmission light, and recognizing a second downstream wavelength corresponding to second transmission light by analyzing the second transmission light;

generating a first control signal for allowing a first transmitting port to pass light corresponding to the first downstream wavelength and allowing a second transmitting port to pass light corresponding to the second downstream wavelength;

outputting the generated first control signal to a first multiplexer including the first transmitting port and the second transmitting port; and, according to the first control signal, controlling the first transmitting port to correspond to the first downstream wavelength and the second transmitting port to correspond to the second downstream wavelength, wherein the first transmitting port receives a transmission light of the first downstream wavelength from a first optical transceiver in the optical communication device, and the second transmitting port receives the second transmission light of the second downstream wavelength from a second optical transceiver in the optical communication device, wherein the first transmission light includes first downstream wavelength information and the second transmission light includes second downstream wavelength information, and wherein the recognizing of the first downstream wavelength and the second downstream wavelength comprises:
receiving first partial transmission light input by coupling a portion of the first transmission light and second partial transmission light input by coupling a portion of the second transmission light, and
recognizing the first downstream wavelength and the second downstream wavelength by analyzing at least a portion of the first downstream wavelength information included in the received first partial transmission light and at least a portion of the second downstream wavelength information included in the received second partial transmission light.

11. The method of claim 10, wherein the first downstream wavelength information and the second downstream wavelength information correspond to an auxiliary management and control channel (AMCC).

12. The method of claim 10, further comprising:
recognizing a first upstream wavelength corresponding to first reply light provided from the outside in response to transmission of the first transmission light; and
controlling a first receiving port included in the first multiplexer to correspond to the first upstream wavelength so that the first receiving port passes light corresponding to the first upstream wavelength,
wherein the first receiving port transmits a reply light of the first upstream wavelength to the first optical transceiver.

13. The method of claim 12, wherein the first reply light includes first upstream wavelength information, and
the recognizing of the first upstream wavelength comprises:
recognizing the first upstream wavelength by analyzing at least a portion of the first upstream wavelength information included in first partial reply light input by coupling a portion of the first reply light.

14. The method of claim 13, further comprising:
recognizing a second upstream wavelength corresponding to second reply light provided from the outside in response to transmission of the second transmission light; and
controlling a second receiving port included in the first multiplexer to correspond to the second upstream wavelength so that the second receiving port passes light corresponding to the second upstream wavelength,
wherein the second receiving port transmits a reply light of the second upstream wavelength to the second optical transceiver.

15. The method of claim 14, wherein the second reply light includes second upstream wavelength information, and
the recognizing of the second upstream wavelength comprises:
recognizing the second upstream wavelength by analyzing at least a portion of the second upstream wavelength information included in second partial reply light input by coupling a portion of the second reply light.

16. The method of claim 15, wherein each of the first upstream wavelength information and the second upstream wavelength information corresponds to an AMCC.

17. An optical wavelength setting device comprising:
a downstream wavelength analyzer configured to analyze first transmission light and second transmission light output from a first optical communication device and recognize a first downstream wavelength corresponding to the first transmission light and a second downstream wavelength corresponding to the second transmission light; and
a controller configured to generate a first control signal for allowing a first transmitting port of a first multiplexer to pass light corresponding to the first downstream wavelength and allowing a second transmitting port of the first multiplexer to pass light corresponding to the second downstream wavelength, and to output the generated first control signal to the first multiplexer,
wherein the first transmitting port receives a transmission light of the first downstream wavelength from a first optical transceiver in the first optical communication device, and the second transmitting port receives the second transmission light of the second downstream wavelength from a second optical transceiver in the first optical communication device, and
wherein the downstream wavelength analyzer is configured to:
receive first partial transmission light input by coupling a portion of the first transmission light and second partial transmission light input by coupling a portion of the second transmission light, and
analyze the received first partial transmission light and the second partial transmission light and recognize the first downstream wavelength and the second downstream wavelength.

18. The optical wavelength setting device of claim 17, further comprising:
an upstream wavelength analyzer configured to receive first reply light transmitted from a second optical communication device in response to reception of the first transmission light and a second reply light transmitted from a third optical communication device in response to reception of the second transmission light, and to recognize a first upstream wavelength corresponding to the received first reply light and a second upstream wavelength corresponding to the received second reply light,
wherein the controller is configured to generate a second control signal for allowing a first receiving port of the first multiplexer to pass light corresponding to the first upstream wavelength and allowing a second receiving port of the first multiplexer to pass light corresponding to the second upstream wavelength, and to output the generated second control signal to the first multiplexer,
wherein the first receiving port transmits a reply light of the first upstream wavelength to the first optical transceiver, and the second receiving port transmits a reply light of the second upstream wavelength to the second optical transceiver.

* * * * *